United States Statutory Invention Registration [19]

[11] Reg. Number: H220

Vogel

[43] Published: Feb. 3, 1987

[54] OPTICAL PERFORMANCE COMPARATOR

[75] Inventor: E. Michael Vogel, Churchville, Md.

[73] Assignee: The United States of America as represented by the Secretary of the Army, Washington, D.C.

[21] Appl. No.: 845,674

[22] Filed: Mar. 13, 1986

[51] Int. Cl.[4] ..... G01M 11/00

[52] U.S. Cl. ..... 356/124.5

*Primary Examiner*—Stephen C. Buczinski
*Assistant Examiner*—Linda J. Wallace
*Attorney, Agent, or Firm*—Anthony T. Lane; Harold H. Card, Jr.; Michael C. Sachs

[57] ABSTRACT

Improved measurement of optical material degradation is provided by a comparator utilizing a vidicon focused upon an illuminated white contrast target card. The optic under test is positioned between the vidicon and the target. The output of the vidicon as it scans the card is compared with the output for an undamaged optic.

8 Claims, 4 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

OPTICAL PERFORMANCE COMPARATOR

GOVERNMENTAL INTEREST

The invention described herein may be manufactured, used or licensed by or for the government for governmental purposes without the paymet to me of any royalties thereon.

BACKGROUND AND FIELD OF THE INVENTION

This invention relates to devices for measuring the quality and performance of optical glass and lenses. More specifically, this invention relates to devices for determining the extent of damage experienced by optical glass and plastic materials which have been exposed to out-of-band high-energy laser radiation. Occasionally, the performance of certain optical devices has been degraded because of exposure to out-of-band high-energy laser radiation. This degradation can be measured in terms of image contrast and resolution. In order to determine whether the optical element need be replaced, one must have a technique of determining both contrast and resolution degradation. Several methods have been developed for determining the performance degradation experienced by laser-damaged optics. One method is a subjective process where an observer looks through a damaged optic and attempts to identify the smallest discernable bar pattern on a contrast bar chart comprised of different size bar patterns. In a second method, a laser beam is projected through the optic and its attenuation is measured with a photo diode. This attenuation is then compared to that of an undamaged optic of the same material. In yet a third method, a narrow vertical-slit light source is projected on the surface of the optic. A photo detector is then indexed across the horizontal axis of the optic, measuring the transmitted light intensity versus position. The result of this measurement is a figure of merit called the line spread function (LSF). With the first method, the results suffer from the problem of inaccuracy due to the subjective nature of the testing. In the case of the second and third methods, elaborate equipment is required to perform the test in addition to a significant amount of time in order to obtain reasonably accurate results.

SUMMARY OF THE INVENTION

These difficulties and others not enumerated here are addressed by the invention, one embodiment of which is an illuminated target positioned in front of a viewing apparatus to define an optical path. The optic under test is positioned in the optical path and the output of the viewing device is measured for changes in amplitude with respect to similar measurements taken with an undamaged optic. By comparing relative amplitude and the rate of change in amplitude, one can determine the degree of degradation.

OBJECTS OF THE INVENTION

It is an object of the invention to provide optical performance measurement using inexpensive and readily available equipment.

It is a further object of the invention to provide optical performance measurement that can be performed rapidly.

It is a further object of the invention to provide optical performance measurement of both resolution and contrast degradation.

BRIEF DESCRIPTION OF THE DRAWINGS

A more complete understanding of the present invention, as well as other objects and advantages thereof not enumerated, will become apparent upon consideration of the following detailed description, especially when considered in light of the accompanying drawings, wherein.

DETAILED DESCRIPTION OF THE INVENTION

Figure 1:
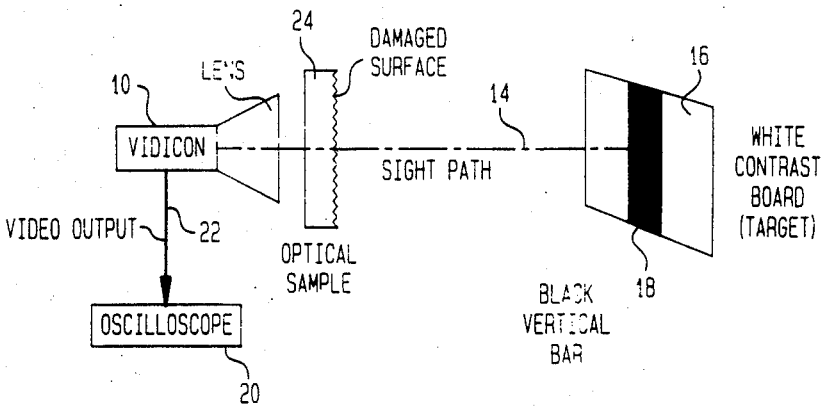
FIG. 1 is a schematic diagram of an optical performance comparator according to the invention.

The equipment employed in performing the optical comparison and the general nature of the test may be best explained by reference to FIG. 1. On the left, there is a vidicon 10 which is attached to a lens 12. The combination of the vidicon 10 and the lens 12 defines an imaginary optical or sight path 14. On the right-hand side, in the line of the optical path 14, there is a target 16 which in this case is a white contrast board having a black vertical bar 18. To register and examine the measurements taken by the vidicon 10, an oscilloscope 20 is connected to the vidicon 10 by the video signal output line 22. Finally, an optical sample 24, to be tested by the comparator, is placed in the optical path 14.

Figure 2:
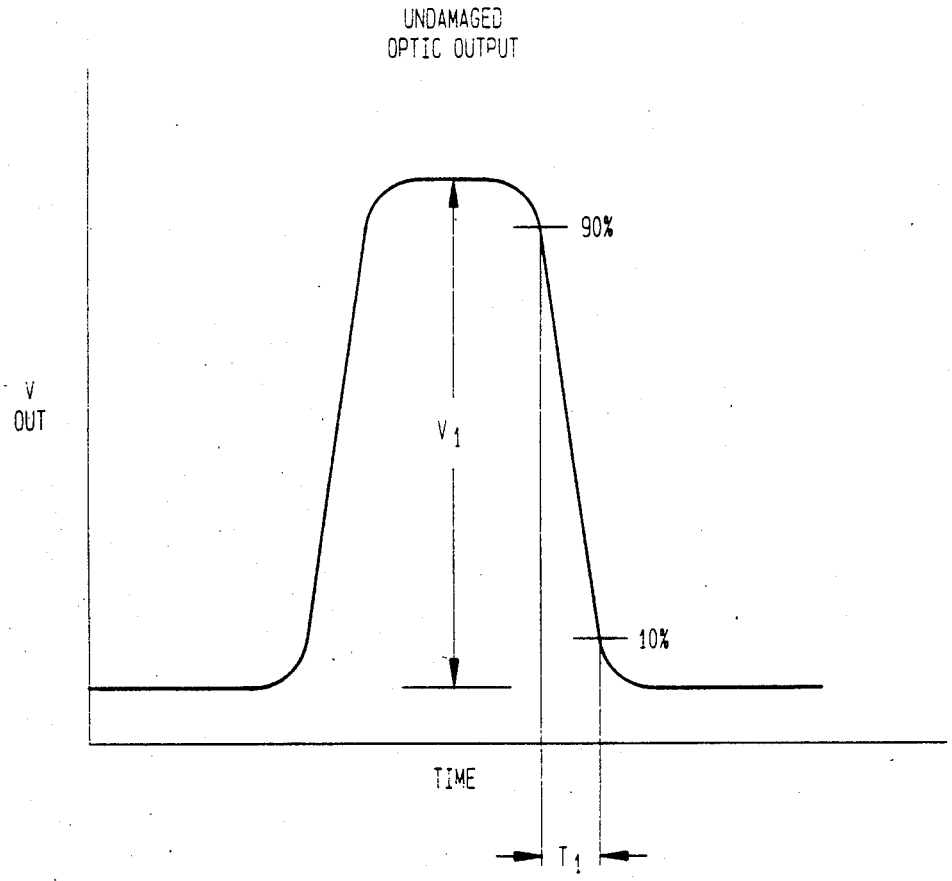
FIG. 2 is a waveform diagram illustrating the output of the viewing means for an undamaged optic.
Figure 3:
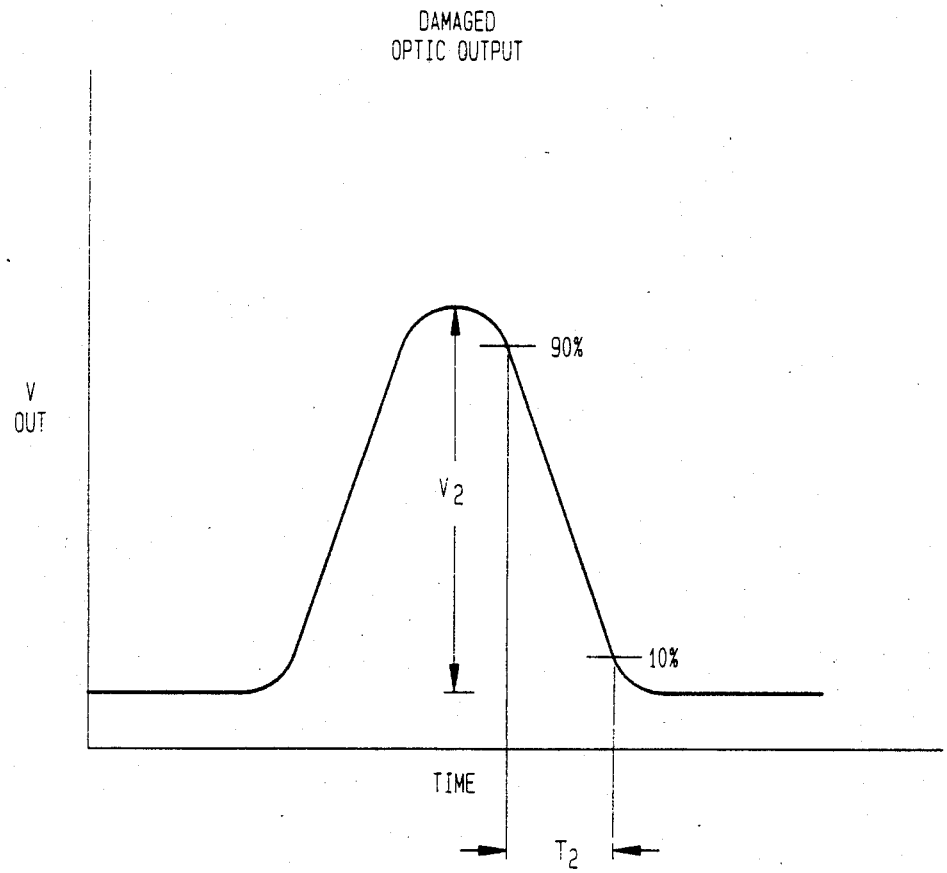
FIG. 3 is a waveform diagram illustrating the output of the viewing means for a damaged optic.

To perform the comparison test, the vidicon 10, which forms the active portion of a television camera is activated scanning the target 16. The oscilloscope 20 is configured to display a specific horizontal scan line. By measuring the pulse amplitude of the signal corresponding to the black bar 18 for an undamaged optic and comparing it to that developed from viewing a damaged optic (optical sample 24) of the same material, a contrast degradation ratio can be determined. The waveform of vidicon output versus time for an undamged optic is illustrated in FIG. 2. Similarly, the waveform diagram for a damaged optic is illustrated in FIG. 3. The first figure of merit, contrast degradation, is determined by comparing the ratio of the difference between peak output and background for the undamaged and damaged optics. These values are illustrated in the waveform diagrams in FIGS. 2 and 3 by $V_1$ and $V_2$ respectively. This ratio can be expressed by Equation 1:

$$\text{contrast degradation} = V_2/V_1 \quad (1)$$

Figure 4:
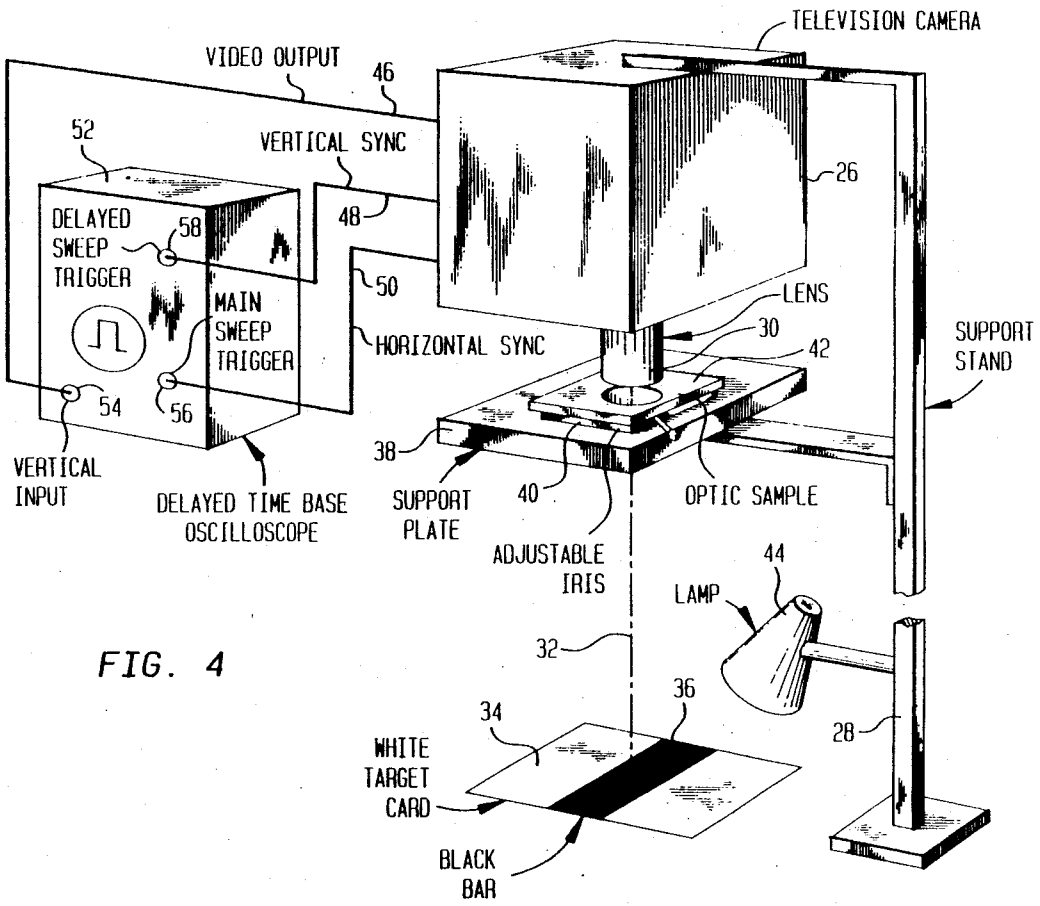
FIG. 4 is a general arrangement diagram of an optical performance comparator according to the invention.

The second figure of merit, resolution degradation may be determined by taking the ratio of time for a specific rise or fall in the signal. In the waveforms in FIGS. 2 and 3, these times, T1 and T2, respectively, are taken as the time for the signal to fall from 90% of the pulse amplitude above background to 10% of that same figure. Thus, resolution degradation can be computed by the following formula:

$$\text{resolution degradation} = T_1/T_2 \quad (2)$$

where $T_1 = T_{(10\%\ V1)} - T_{(90\%\ V1)}$ $T_2 = T_{(10\%\ V2)} - T_{(90\%\ V2)}$ The structure of a practical embodiment of the optical performance comparator can be best explained by reference to FIG. 4. The viewing means, a television camera 26, is attached to a support stand 28. A lens 30 is attached to the television camera 26 and serves to define an imaginary optical path 32. A target 34, in this case a white target card having a black bar 36, is located in the optical path 32 so that it can be viewed by the television camera 26. Between the white target card 34 and the television camera 26 is a support plate 38 which has an adjustable iris 40. The optic sample 42 to be tested is placed on the support plate 38 on top of the adjustable iris 40. Further, there is a lamp 44 attached to the support stand 28 which provides illumination of the target card 34.

The television camera 26 has three outputs: a video signal output 46, a vertical sync output 48, and a horizontal sync output 50. These three outputs are connected to an oscilloscope 52 which has the capability of triggering by delayed sweep. Accordingly, the oscilloscope 52 has a vertical input 54 a main sweep trigger input 56 and a delayed sweep trigger input 58. The video output 46 of the television camera 26 is connected to the vertical input 54, while the vertical sync output 48 is connected to the delayed sweep trigger input 58. Finally, the horizontal sync output 50 of the television camera 26 is connected to the main sweep trigger input 56.

The optic sample 42 is placed upon the adjustable iris 40, damaged side down. The iris can be adjusted for an opening ranging from 0.2 to 4.9 $cm^2$. To provide a proper signal for the television camera 26, the intensity of the lamp 44 can be adjusted. The distance from the lens 30 to the white target card 34 is nominally set at 1.0 m.

By connecting the outputs of the television camera 26 to the oscilloscope 52 in the manner described above, a specific raster scan can be selected for viewing. If the television camera 26 has an AGC or automatic light level compensation, this must be defeated in order to obtain accurate results. This will result in an output similar to that illustrated in FIG. 3. This output is then compared against the output for an undamaged optic, as illustrated in FIG. 2, in accordance with Equations 1 and 2.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed:

1. An optical performance comparator for determining optical degradation of an optical device, comprising:

support means for the optical device;

target means for viewing through the optical device;

illumination means for illuminating the target means;

viewing means for selectively and incrementally viewing the target means through the optical device, the viewing means having an output proportional to the magnitude of light sensed by the viewing means; and measuring means for measuring the amplitude and phase changes in the output of the viewing means with respect to time.

2. An optical performance comparator as set forth in claim 1 above where the target means has at least one white portion bordering on at least one black portion.

3. An optical performance comparator as set forth in claim 2 above where said viewing means includes a vidicon tube means.

4. An optical performance comparator as set forth in claim 2 above where the viewing means is a television camera.

5. An optical performance comparator as set forth in claim 4 above where the television camera includes raster scanning circuitry and outputs of horizontal and vertical synchronization signals.

6. An optical performance comparator as set forth in claim 5 above where said measuring means is an oscilloscope.

7. An optical performance comparator as set forth in claim 6 above where said illumination means is a lamp.

8. An optical performance comparator as set forth in claim 7 above further including optical path support means for positioning and supporting the optical device support means, the viewing means, and the target means along a common optical path.

* * * * *